United States Patent [19]

Derrick

[11] 4,069,722

[45] Jan. 24, 1978

[54] VARIABLE RATIO BRAKE PEDAL LEVER ASSEMBLY

[75] Inventor: Dennis P. Derrick, Xenia, Ohio

[73] Assignee: General Motors Corporation, Detroit, Mich.

[21] Appl. No.: 665,901

[22] Filed: Mar. 11, 1976

[51] Int. Cl.² ............................................. G05G 1/04
[52] U.S. Cl. ..................................................... 74/516
[58] Field of Search ........................................ 74/516

[56] References Cited

U.S. PATENT DOCUMENTS

| 1,911,223 | 5/1933 | D'Aleo | 74/516 |
| 3,316,776 | 5/1967 | Schröter | 74/516 |
| 3,988,945 | 11/1976 | Fasano | 74/516 |

Primary Examiner—Samuel Scott
Assistant Examiner—Wesley S. Ratliff, Jr.
Attorney, Agent, or Firm—D. D. McGraw

[57] ABSTRACT

A brake pedal lever assembly having a cam surface engaged by a cam follower on one end of a master cylinder push rod and so arranged that as the brake pedal lever is moved in the brake actuating direction a cam also on the pedal lever moves the push rod cam follower upwardly toward the brake pedal lever pivot point, increasing the brake pedal lever ratio. A modification has a jointed pedal lever which yieldably resists bending movement. When the bending movement does occur, the cam moves the push rod cam follower at a faster rate, increasing the pedal ratio at a faster rate.

2 Claims, 3 Drawing Figures

VARIABLE RATIO BRAKE PEDAL LEVER ASSEMBLY

The invention relates to a variable ratio brake pedal lever system and mor particularly to one utilizing a cam arrangement on the pedal lever and a cam follower arrangement on the master cylinder push rod to shift the effective point at which force is transferred from the brake pedal lever during brake actuating movement of that lever so as to increase the effective brake pedal ratio during brake actuating movement from a release position to a full brake apply position. In one modification the brake pedal lever is a unitary member. In another modification it is a jointed member having yieldable means resisting jointed movement until a predetermined amount of brake pedal force is applied. When the predetermined force is reached and exceeded, the jointed movement of the pedal lever occurring due to yielding action of the yieldable means causes the pedal ratio to increase at a faster rate than when the pedal lever is a unitary member.

Figure 1:
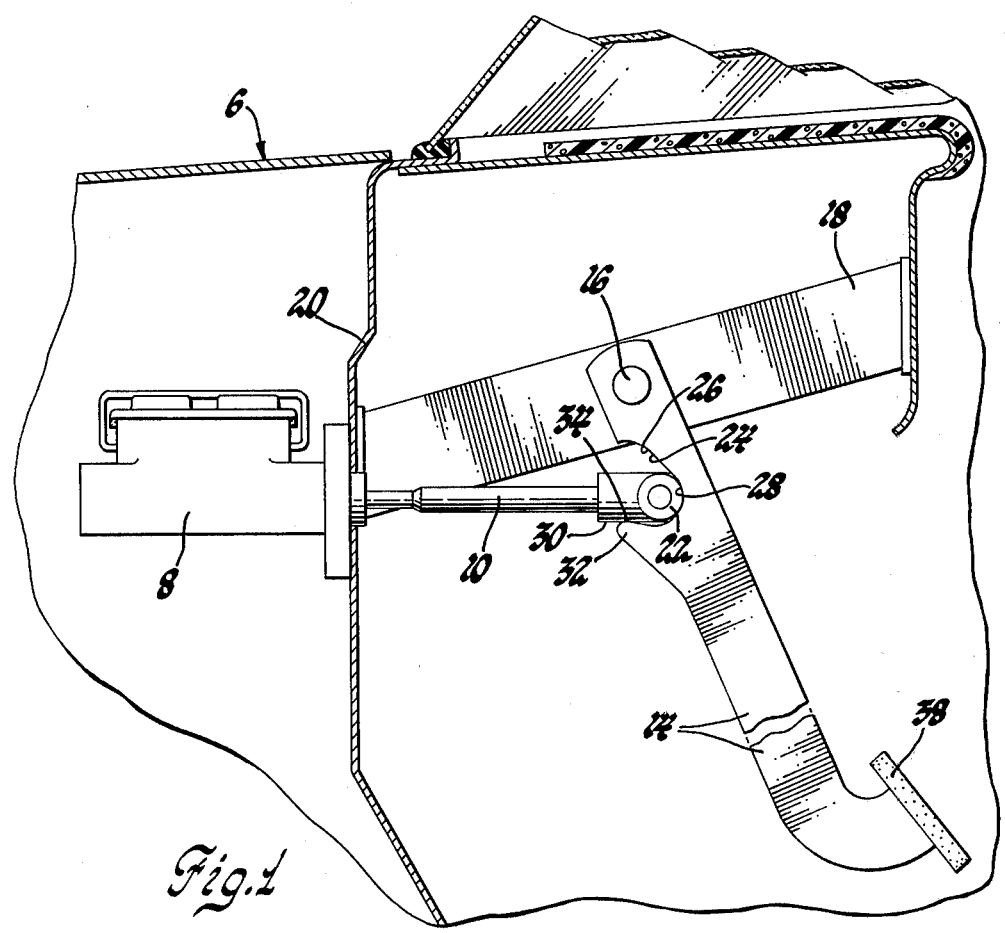
FIG. 1 illustrates a portion of a vehicle with parts broken away and in section and showing in elevation a brake pedal lever assembly embodying the invention. The assembly is in the brake release position.

The vehicle 6 is illustrated as having a brake actuating system installed so as to be readily operable by the vehicle operator. The system includes a master cylinder 8 which is actuated by a push rod 10. One end 12 of the push rod is pivotally mounted to a portion of the master cylinder in a manner well-known in the art so as to permit push rod pivotal movement of the type illustrated in FIG. 2 as the pedal lever system is actuated. The brake pedal lever 14 is pivotally mounted on pivot 16, which is provided on a fixed brace 18 forming a part of the vehicle body. The master cylinder 8 is illustrated as being mounted on the fire wall 20 of the vehicle body. A cam follower 22 is mounted on the other end of push rod 10. The follower is illustrated as being of the roller type in order to minimize friction losses and provide an adequate force transmitting arrangement. Guide checks may be provided on each side of such a roller. A first cam surface 24 is formed on one edge of the brake pedal lever 14 and so arranged that it is engaged in camming relation by the cam follower 22. Cam surface 24 extends generally along the lever edge from a first point 26 to a second point 28. The first point 26 is spaced from the pivot 16 of lever 14 toward the food-engageable end of the brake pedal lever, and the second point is spaced in the same direction but further from the pivot 16 than the first point. A cam follower surface 30 is provided on the push rod 10 adjacent the end on which the cam follower 22 is mounted. Cam follower surface 30 extends axially along the lower side of the push rod from the cam follower 22 toward the push rod end 12. A cam 32 is formed on the brake pedal lever 14 and extends generally toward the master cylinder 8 from the brake pedal lever second point 28 so as to engage the cam follower surface 30 and provide a fulcrum point 34 for the push rod 10. A cam follower stop 36 is formed on the brake pedal lever at the first point 26 of cam follower 24. In the embodiment illustrated, the stop 36 is essentially an extension of the first cam surface 24, covering an arcuate portion of substantially the same radius as that of the roller type cam follower. A sufficient arc is utilized so that the cam follower 22 will engage the stop 36 and remain against it without tending to roll out of the depression formed by the stop and the cam surface 24 in the brake pedal lever edge.

Figure 2:
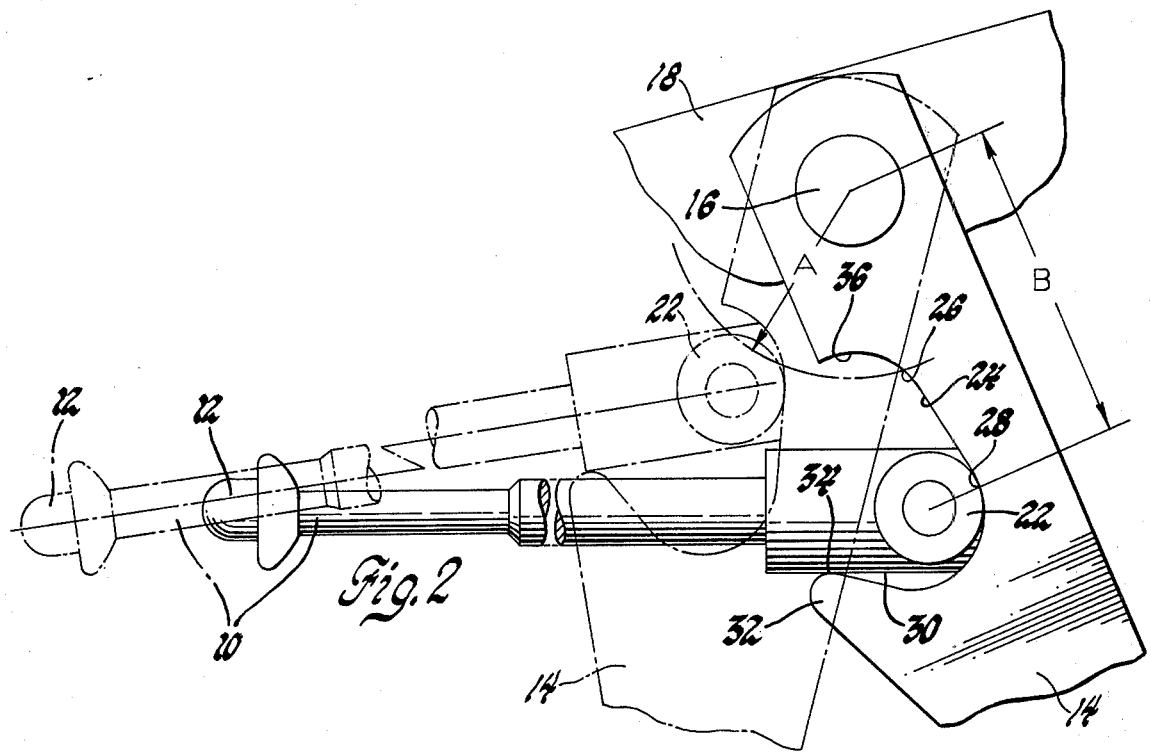
FIG. 2 illustrates the brake release position and the full brake apply position of the mechanism of FIG. 1, parts being broken away and in section and the full brake apply position being in phantom lines.

When the system is in the brake release position shown in FIG. 1 and shown in solid lines in FIG. 2, the cam follower 22 engages the first cam surface 24 immediately adjacent the second point 28. Cam 32 engages the cam follower surface 30, tending to support the push rod 10 at the cam follower end. For this purpose cam follower surface 30 is on the bottom of the push rod with cam 32 extending slightly upwardly. Also, cam surface 24 extends at a slight angle relative to the center line of lever 14 passing through the axis of pivot 16. The plane in which cam surface 24 is positioned, if extended, would pass between pivot 16 and the master cylinder 8.

Movement of the brake pedal lever 14 by the vehicle operator is accomplished in the usual manner. The operator's foot is pressed against the brake pedal 38 on the end of the lever 14 opposite pivot 16 so as to move lever 14 arcuately about pivot 16 in a clockwise direction as seen in the drawings. This lever movement causes the push rod 10 to move axially to pressurize brake fluid in the master cylinder 8. It also causes cam 32 to move in an upward arc as it moves axially along the cam follower surface 30, forcing the push rod to move pivotally about push rod end 12 in the plane of the brake pedal lever movement. The arrangement is such that this causes movement of cam follower 22 along the first cam surface 24 toward the first point 26. This decreases the distance between the point of engagement of cam follower 22 with cam surface 24 and pivot 16, thereby increasing the effective pedal lever ratio as brake actuating movement increases. If the brake pedal lever is moved to its full extent in the brake actuating direction, the cam follower 22 will engage cam follower stop 36 to prevent further camming movement.

Due to the angle of cam surface 24, release of the brake pedal lever 14 and the pedal returning action of the master cylinder 8 will cause the push rod 10 to return to the release position shown in FIG. 1. The cam follower 22 will move to the second point 28 and the cam follower end of the push rod will continue to be supported by cam 32.

Figure 3:
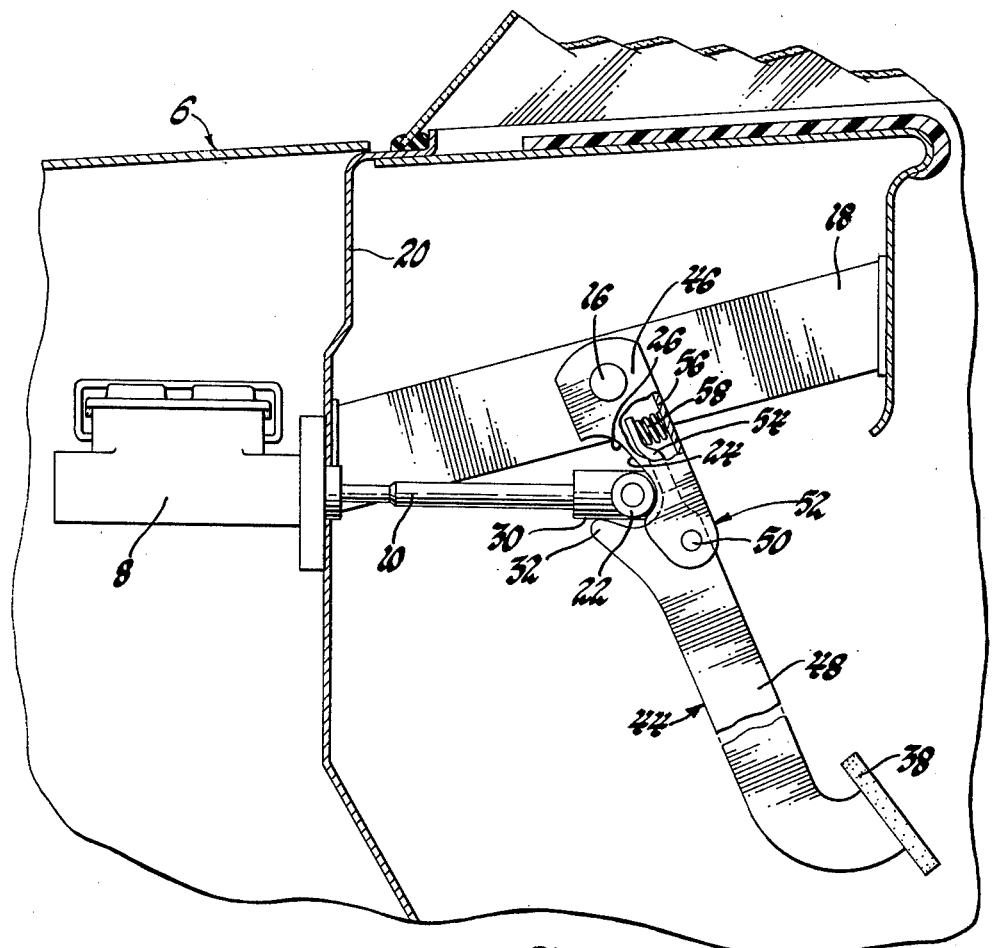
FIG. 3 is a view similar to FIG. 1 and shows a modification of the assembly of FIG. 1.

The modification illustrated in FIG. 3 utilizes a jointed brake pedal lever 44 having a lever section 46 pivotally attached by pivot 16 to brace 18. Another lever section 48 is pivotally secured to lever section 46 by a pivot 50 to provide a pivot joint 52 intermediate the brake pedal lever ends 54 and 56. The first cam surface 24 is formed on lever section 46, while cam 32 is formed on lever section 48. They are respectively engaged by the cam follower 22 and cam follower surface 30 as before. A finger 54 extends from lever section 48 beyond joint 52 toward pivot 16. It is preferable in this arrangement that lever section 45 have a channel-like cross section with the open portion of the channel being toward the master cylinder 8. The first cam surface 24 is therefore provided on the edges of both channel sides. The channel bottom 56 and the finger 54 have yieldable means such as compression spring 58 positioned therebetween and suitably secured so as to remain in this position. The yieldable means acts between the lever sections 46 and 48 and prevents relative pivotal movement between the lever sections during the initial portion of the brake actuating movement of the lever. When a predetermined brake actuating force is exerted by the vehicle operator on the lever, the yieldable means 58 begins its yielding action, allowing brake pedal section 48 to pivot slightly clockwise about pivot 50 relative to lever section 46 while both lever sections continue to pivot clockwise about pivot 16.

The modification in FIG. 3 operates in the same general manner as the system of FIGS. 1 and 2. Until the yieldable means 58 begins to yield, there is no operational difference. As the brake actuating force exerted on the brake lever pedal 38 continues to increase, however, with concurrent yielding action of yieldable means 58, the cam 32 will move the push rod pivotally upward at a slightly faster rate than in the arrangement of FIGS. 1 and 2. This causes the cam follower 22 to move toward the first cam surface point 26 at a higher rate of movement, thereby increasing the effective pedal lever ratio as further brake actuating movement increases, such ratio increase being at a somewhat faster rate than the arrangement of FIGS. 1 and 2.

In both arrangements, the effective length of the arm from the brake pedal pivot 16 to roller 22 changes from length B to length A, as illustrated in FIG. 2, upon full pedal stroke.

What is claimed is:

1. A variable ratio brake pedal lever system comprising:
    a push rod pivotally mountable at one end and adapted to be moved axially to actuate a brake system;
    a pivotally mounted brake pedal lever movable between brake release and full brake system actuating positions;
    a first cam follower on the other end of said push rod;
    a cam surface on said lever engaged in camming relation with said first cam follower and extending generally along an edge of said lever from a first point spaced from the pivot mounting of said lever to a second point spaced further from the pivot mounting of said lever than said first point;
    a second cam follower on said push rod adjacent said other end and extending axially along the push rod;
    a cam formed on said lever at said cam surface second point and extending from said lever to engage said second cam follower and provide a fulcrum point for said push rod;
    and a cam follower stop formed on said lever at said cam surface first point;
    said first cam follower engaging said cam surface adjacent said second point and said cam engaging said second cam follower when the lever is in the brake release position, movement of the lever for brake actuation causing said push rod to move axially and said cam to move axially along said second cam follower and force said push rod other end to move pivotally about said push rod one end in the plane of lever movement to move said first cam follower along said cam surface toward said first point, thereby increasing the effective pedal lever ratio as brake actuating movement increases, said first cam follower engaging said cam follower stop upon full brake actuating movement of said lever.

2. A variable ratio brake pedal lever system comprising:
    a push rod pivotally mountable at one end and adapted to be moved axially to actuate a brake system;
    a pivotally mounted brake pedal lever movable between brake release and full brake system actuating positions, said lever having first and second lever sections, said first section being pivotally secured to said second section to provide a pivot joint intermediate the brake pedal lever ends, and yieldable means acting between said sections and preventing relative pivotal movement therebetween until a predetermined brake actuating force is exerted on said lever;
    a first cam follower on the other end of said push rod;
    a first cam surface on said lever first section engaged in camming relation with said first cam follower and extending generally along an edge of said lever first section from a first point spaced from the pivot mounting of said lever to a second point spaced further from the pivot mounting of said lever than said first point;
    a second cam follower on said push rod adjacent said other end and extending axially along the push rod;
    a cam formed on said lever second section adjacent said cam surface second point and said pivot joint and extending from said lever second section to engage said second cam follower and provide a fulcrum point for said push rod;
    and a cam follower stop formed on said lever first section at said cam surface first point;
    said first cam follower engaging said cam surface adjacent said second point and said cam engaging said second cam follower when the lever is in the brake release position, movement of the lever for brake actuation causing said push rod to move axially and said cam to move axially along said second cam follower and force said push rod other end to move pivotally about said push rod one end in the plane of lever movement to move said first cam follower along said cam surface toward said first point, thereby increasing the effective pedal lever ratio as brake actuating movement increases, said yieldable means yielding when said predetermined brake actuating force is exerted to move said cam to move said first cam follower toward said first point at a higher rate of movement, thereby further increasing the effective pedal lever ratio as further brake actuating movement increases, said first cam follower engaging said cam follower stop upon full brake actuating movement of said lever.

* * * * *

UNITED STATES PATENT OFFICE
CERTIFICATE OF CORRECTION

Patent No. 4,069,722    Dated January 24, 1978

Inventor(s) Dennis P. Derrick

It is certified that error appears in the above-identified patent and that said Letters Patent are hereby corrected as shown below:

Column 1, line 5, "mor" should read -- more --;

line 55, "food-" should read -- foot- --.

Column 2, line 1, delete "follower" and insert therefor -- surface --;

line 24, before "lever" delete "the";

line 60, "45" should read -- 46 --.

Column 4, line 23, delete "first" (first occurrence).

Signed and Sealed this

Twenty-third Day of May 1978

[SEAL]

Attest:

RUTH C. MASON
Attesting Officer

LUTRELLE F. PARKER
Acting Commissioner of Patents and Trademarks